(12) United States Patent
Mishra et al.

(10) Patent No.: US 7,739,313 B2
(45) Date of Patent: Jun. 15, 2010

(54) METHOD AND SYSTEM FOR FINDING CONJUNCTIVE CLUSTERS

(75) Inventors: Nina Mishra, San Ramon, CA (US); Dana Ron, Tel Aviv (IL); Ram Swaminathan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1329 days.

(21) Appl. No.: 10/448,899

(22) Filed: May 30, 2003

(65) Prior Publication Data

US 2004/0243546 A1    Dec. 2, 2004

(51) Int. Cl.
G06F 7/00 (2006.01)
G06F 17/30 (2006.01)

(52) U.S. Cl. ....................................... 707/803; 707/723
(58) Field of Classification Search ................. 707/1–3, 707/5, 6, 10, 100–102, 803, 723
See application file for complete search history.

(56) References Cited

U.S. PATENT DOCUMENTS

| | | | | |
|---|---|---|---|---|
| 5,388,259 A | * | 2/1995 | Fleischman et al. | 707/5 |
| 5,499,371 A | * | 3/1996 | Henninger et al. | 717/108 |
| 6,182,061 B1 | * | 1/2001 | Matsuzawa et al. | 707/2 |
| 6,326,962 B1 | * | 12/2001 | Szabo | 715/762 |
| 6,523,026 B1 | * | 2/2003 | Gillis | 707/3 |
| 2002/0129015 A1 | * | 9/2002 | Caudill et al. | 707/6 |
| 2002/0174119 A1 | * | 11/2002 | Kummamuru et al. | 707/6 |

OTHER PUBLICATIONS

Breitfelder, Kim et al., The Authoritative Dictionary of IEEE Standards Terms, 2000, Seventh ed., p. 37.*
Dieten, Jochem Van et al., "Randomizing Query Results" Oct. 2002, www.houseoffusion.com, pp. 1-5.*
Mishra, Nina, et al., "On Finding Large Conjunctive Clusters" 2003, kfupm.edu.sa <https://eprints.kfupm.edu.sa/54257/1/54257.pdf>, p. 1-15.*

* cited by examiner

Primary Examiner—Apu M Mofiz
Assistant Examiner—Brent Stace

(57) ABSTRACT

A method and system for finding a conjunctive cluster is disclosed. The method includes identifying a first group of points, identifying a second group of points, drawing a first sample from the first group of points of a first predetermined size and identifying subsets of the first sample. For each subset of the first sample of a second predetermined size the method includes identifying a subgroup of the second group of points that share an intersection with all of the points in the first sample of points, identifying a sub group of said first group of points that share an intersection with a specified number of the points in the subgroup of the second group of points and outputting a third group of points. It should be appreciated that the product of the magnitude of the subgroup of the second group and the magnitude of the subgroup of the first group is maximized.

30 Claims, 10 Drawing Sheets

One Conjunctive Cluster: Max Edge Biclique

- Given a bipartite graph G=(U,W,E), the *max edge biclique* problem is: find (U*,W*) that
  - (a) is biclique ~102C
  - (b) has the most edges, i.e., max |U*||W*|
    $\searrow$ 104C
- HARDNESS:

- Hardness indicates that what makes max edge biclique hard is the insistence on biclique.

Figure 1C

Max Edge Relaxed-Biclique

- Given a bipartite graph G=(U,W,E), the *max edge relaxed-biclique* problem is: find (U',W') that
  102D — (a) is close to biclique [E(U',W') >= (1-ε')| U'| | W'| ]
  - (b) has at least as many edges as the maximum edge biclique [E(U',W') >= E(U*,W*)]

- Reasonable (desirable) relaxation in practice:
  - Assign a machine to a cluster description if it has most of the software in the cluster description.

METHOD AND SYSTEM FOR FINDING CONJUNCTIVE CLUSTERS

TECHNICAL FIELD

Embodiments, of the present disclosure relate generally to clustering methods, and systems. In particular, embodiments of the present disclosure relate to a method and system for finding conjunctive clusters.

BACKGROUND ART

Clustering is the process of grouping objects so that points grouped in the same cluster are similar (and points grouped in different clusters are dissimilar). Community discovery is the process of identifying groups that are similar. These related processes have been studied in numerous areas of application including the finding of product communities, data mining, pattern recognition, and machine learning. By and large, research in these areas has focused on partitioning objects so that some clustering measure such as the k-median measure (where the object is to minimize the average distance from a point to its nearest center) is optimized. It should be appreciated that the objective of the conjunctive clustering process is to find a predetermined number of clusters of at least a minimum size that do not overlap by more than a predetermined amount.

In many applications, clustering may be needed to obtain meaningful conjunctive descriptions of groups of objects. For example in a customer segmentation application, the objective is to identify clusters of customers that have similar buying behavior. The cluster descriptions that emerge may then be used to facilitate operations such as target marketing. By contrast, in a text clustering application, the objective is to find descriptions of groups of documents that contain similar content. The words that are typical of the cluster may then be used to describe the cluster. For instance, a cluster of documents that discuss how to print in the landscape mode may be described by the conjunction of keywords "laserjet and 'landscape mode' and printing". It should be appreciated that such clusters may be used as a basis for constructing a topic hierarchy.

Conventionally, clusters may be found in a two step process that involves: (1) clustering (e.g., the grouping of objects) and (2) obtaining descriptions of the clusters. It should be appreciated that step (1) may be effectuated by optimizing the k median or the k-center quality measure of the objects that are grouped. And, step (2) may be effectuated by assigning the same class label to points in the same cluster and by performing operations that generate descriptions which separate the clusters.

Conventionally, clustering methodologies try to optimize a cost function while learning methodologies seek to find (possibly complex) descriptions that best fit each cluster. Therefore, a common byproduct of such processes is that the resulting descriptions may be difficult to understand. In addition, if the learning method is required to output conjunctions, the conjunctions may serve as poor descriptions of the clusters (since the clusters found are inherently more complex). Consequently, by performing the aforementioned steps (1) and (2) separately, (as some conventional methodologies do) one may be sacrificing the descriptive quality of the final clusters (either because they are too complicated to understand, or because they are too simple to describe the clusters).

It should be appreciated that in the process of finding clusters conventional methodologies may employ the generation of both a collection of points and a corresponding vector representation of these points in Euclidean space. Such methodologies characterize attributes in order to generate the vectors. From the generated vectors a collection of points emerge which may be subjected to a clustering algorithm to find the k median clusters.

A drawback of this approach is that it may not be meaningful to represent given data in Euclidean space (e.g., such as an attempted vector representation of a machine). In addition, it may be problematic to define the distance between two points since there must actually be a way of computing the distance between the two points. Moreover, in utilizing such conventional methodologies a notion of distance is needed in order for an appropriate minimization function to be formulated. Another drawback of conventional methodologies is that points are assigned to exactly one cluster and all of the points found may be required to be clustered (such methodologies may not allow the exclusion of some points in the clustering process).

SUMMARY OF THE INVENTION

A method and system for finding a conjunctive cluster is disclosed. The method includes identifying a first group of points, identifying a second group of points, drawing a first sample from the first group of points of a first predetermined size and identifying subsets of the first sample. For each subset of the first sample of a second predetermined size the method includes identifying a subgroup of the second group of points that share an intersection with all of the points in the first sample of points, identifying a sub group of the first group of points that share an intersection with a specified number of the points in the subgroup of the second group of points and outputting a third group of points. It should be appreciated that the product of the magnitude of said subgroup of the second group and the magnitude of the subgroup of the first group is maximized.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 1C is a chart that describes a maximum edge biclique according to embodiments of the present invention.

FIG. 1D is a chart that describes a maximum edge relaxed biclique according to embodiments of the present invention.

DETAILED DESCRIPTION OF THE INVENTION

Figure 1A:
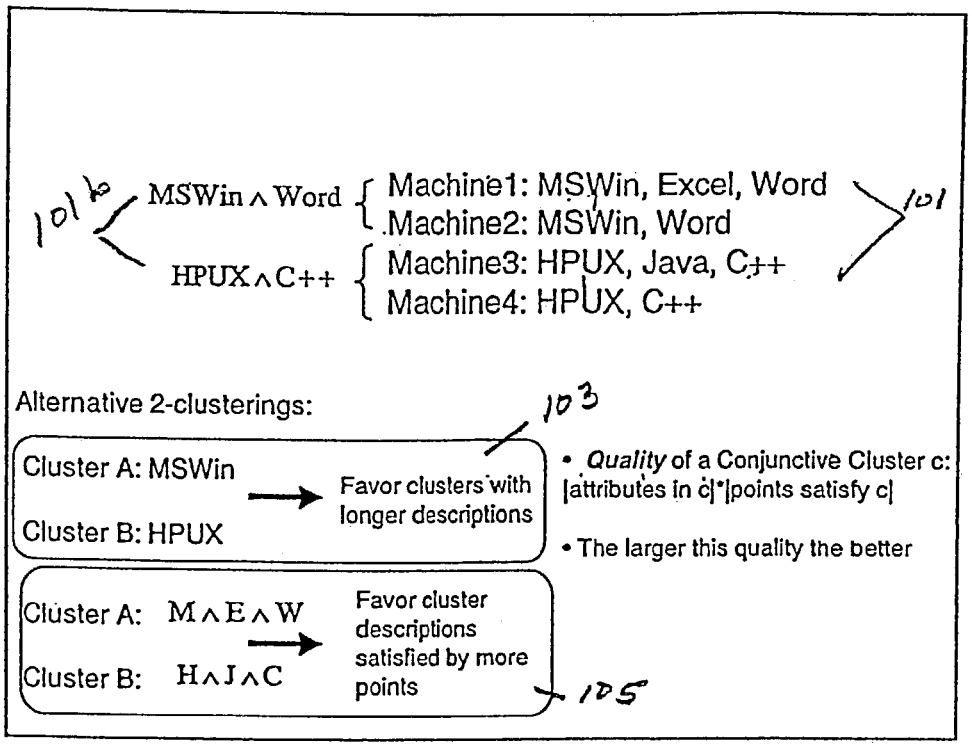
FIG. 1A is a chart that shows conjunctive clusters according to embodiments of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing, and other symbolic representations of operations on data bits within a computer system or electronic computing device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "sampling" or "identifying" or "drawing" or the like, refer to the action and processes of a computer system, or similar electronic computing device, that manipulates and transforms data. For example, the data is represented as physical (electronic) quantities within the computer system's registers and memories and is transformed into other data similarly represented as physical quantities within the computer system memories or registers or other such information storage, transmission, or display devices.

Exemplary Embodiments of Conjunctive Clustering in Accordance with the Present Invention According to embodiments of the present invention clustering may be viewed as a process of collecting bicliques (e.g., conjunctive clusters). According to one embodiment, the overlapping of clusters may be allowed in that each point may belong to multiple clusters and an attribute may be used to describe multiple clusters that are collected. According to such embodiments, an algorithm that finds such clusters may ignore some points if the points do not fall into one of the k largest clusters as is described herein.

According to exemplary embodiments, the problem of identifying cluster descriptions may be accomplished by considering a notion of clustering where a point may be assigned to a cluster if it merely substantially satisfies the cluster description. This relaxed notion of conjunction is useful in both theory and practice. In this manner embodiments of the present invention provide for the identification of cluster descriptions, where the provision of subsets of points that each belong to the same cluster may be unnecessary.

According to exemplary embodiments of the present invention, sampling may be used to dramatically reduce the number of points that need to be processed in order to obtain good conjunctive clusters. As a result, the algorithm may not have to read into main memory the entire data set (which tends to be a substantial problem parameter). Moreover, the algorithms running time may be independent of the number of points sampled.

According to exemplary embodiments, quantifying the distance between points may not be crucial. According to such embodiments, determining whether a point possesses an attribute/value combination may be more important (which may be easier in some applications). It should be appreciated that although categorical clustering algorithms may be employed, the search for simple conjunctive cluster descriptions may not be typically addressed by categorical clustering methods.

Biclique advantages according to embodiments of the present invention may include the elimination of the need to represent data in euclidean space, the elimination of the need to quantify distances between points, and the allowance of the grouping of overlapping clusters. Conventional machine learning algorithms which employ strict clustering methodologies may produce undecipherable, complicated and extremely large decision trees. By contrast the relaxed clustering methodology employed in at least one embodiment of the present invention produces simple comprehensible conjunctive descriptions.

Another advantage of exemplary embodiments of the present invention is that the biclique algorithm is sub-linear. In data mining applications often the number of points desired to be clustered are much larger than the number of attributes present. In fact, the number of points may be so large that every point may not be clustered. Because the amount of data that needs processing may be much larger than the size of main memory, being required to review all of the data and to make multiple passes in the data analysis process may present substantial challenges. Embodiments of the present invention may avoid these problems by allowing a sample to be drawn from the clustered points which facilitates a more efficient mining of the clustered data.

Conjunctive Clustering

FIG. 1A is a chart that shows conjunctive clusters according to one embodiment of the present invention. A biclique corresponds to a conjunctive cluster. According to exemplary embodiments, each point need not be clustered and some points may be assigned to multiple clusters. In addition, sampling may be used to dramatically reduce the number of points that need to be processed in order to obtain a good conjunctive cluster. According to one embodiment, an attribute/value combination may be emphasized in determining whether a point belongs to a cluster as opposed to its location in metric space. FIG. 1A shows points/attributes 101(machines 1-4 comprising software Microsoft Windows™, Microsoft Word™, HPUX™, C++™, Microsoft Excel™, and JAVA™), conjunctive descriptions 101b, and alternative clusters 103 and 105.

Conjunctive descriptions 101b (Microsoft Windows™, Microsoft Word™, HPUX™, C++™) describe attributes of conjunctive clusters according to one embodiment of the present invention. The alternative descriptions 103 (Microsoft Windows TM and HPUX™) and 105 (See FIG. 1A) show alternative ways of clustering the machines listed in chart 100. As is shown in FIG. 1A, alternative clusters 103 do not include as many description points as are included in alternative clusters 105. According to one embodiment of the present invention, conjunctive clusters having longer descriptions are favored over those having shorter descriptions because longer descriptions are considered to be more descriptive of a conjunctive cluster. However, a problem arises when the descriptions are too long (see alternative description 105 in FIG. 1A). This is because each attribute included in a description may limit the number of points found to possess the combination of attributes found in the description. Consequently, the objectives of finding sufficiently descriptive conjunctive descriptions and finding conjunctive descriptions that are not excessively descriptive must be balanced. As is shown in FIG. 1A, the quality of the conjunctive cluster is given by the product of the points and attributes.

Figure 1B:
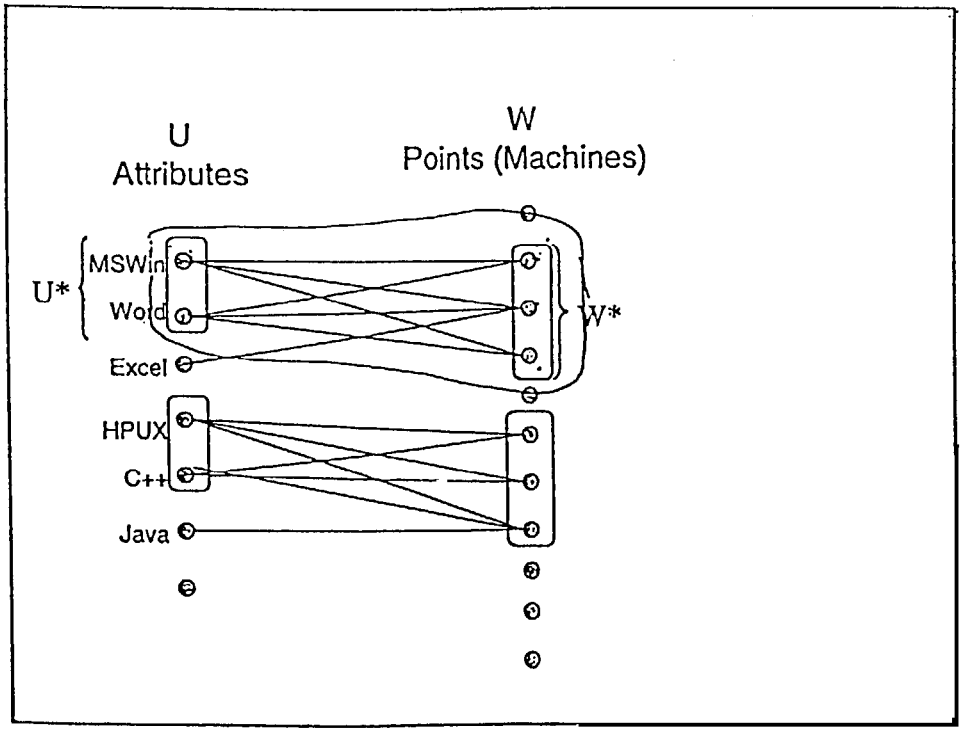
FIG. 1B shows a bipartite graph of conjunctive clusters clustered according to embodiments of the present invention.

FIG. 1B shows a bipartite graph of conjunctive clusters clustered according to one possible embodiment of the present invention. FIG. 1B shows attributes U and points W. U* is a subset of attributes U, and W* is a subset of points W. (U*, W*) is a biclique if there is an edge between each vertex in U* and W*. As previously mentioned, a biclique corresponds to a conjunctive cluster. As is shown in FIG. 1B, the number of edges in a biclique determines the size of the conjunctive cluster.

FIG. 1C is a chart that describes a maximum edge biclique according to one embodiment of the present invention. As described in FIG. 1C, given a bipartite graph G-(U, W, E), the cluster (U*, WI*) that is biclique 102C and has the most edges 104C is the maximum edge biclique. In some cases, finding such a biclique may be computationally challenging (NP-hard) as is noted in FIG. 1C. In such cases the maximum edge relaxed biclique may be found (see FIG. 1D) according to exemplary embodiments of the present invention.

FIG. 1D is a chart that describes a maximum edge relaxed biclique according to one embodiment of the present invention. As described in FIG. 1D, given a bipartite graph G-(U, W,E), the cluster (U*,W*) that is close to biclique 102D and has as many edges as the maximum edge biclique is a maximum edge relaxed biclique. According to one embodiment of the present invention, with maximum edge relaxed bicliques, a point may be assigned to a cluster description if it possesses most of the attributes included in a cluster description. It should be appreciated that in some instances it may be desirable to find the k (see discussion below) largest relaxed bicliques.

Figure 1E:
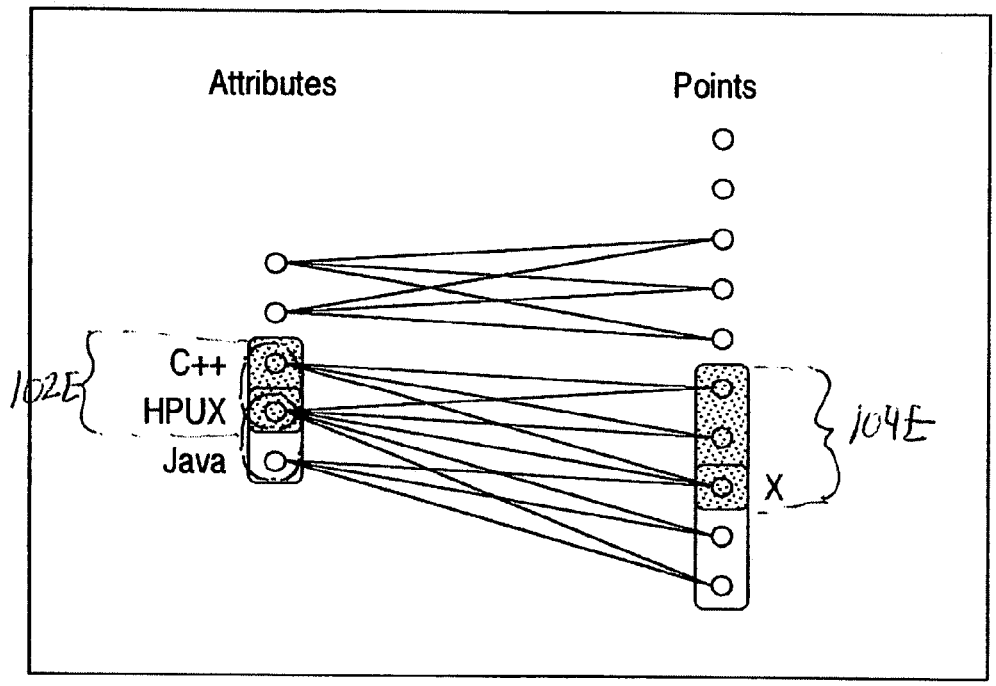
FIG. 1E is a chart showing how conjunctive clusters may overlap according to embodiments of the present invention.
Figure 1F:
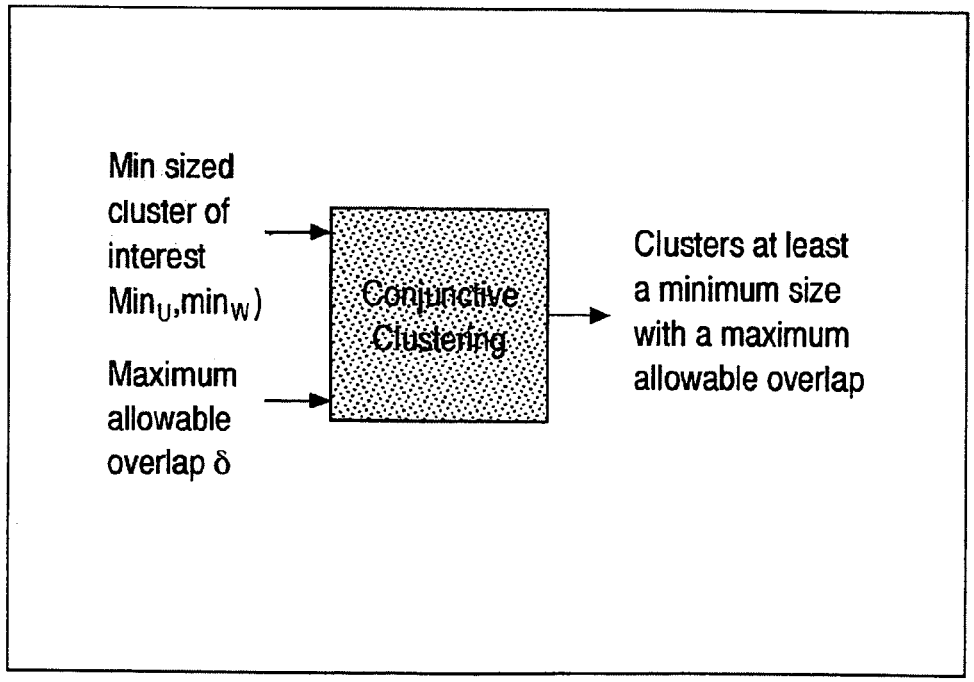
FIG. 1F is a chart which shows that given information such as a minimum sized cluster of interest and a maximum allowable overlap, such clusters may be found according to exemplary embodiments of the present invention.

FIG. 1E is a chart showing how conjunctive clusters may overlap according to one embodiment of the present invention. The conjunctive clusters shown in FIG. 1E possess both attributes 102E and points 104E in common. Embodiments of the present invention facilitate the finding of k clusters of a minimum size with a maximum allowable overlap. FIG. 1F is a chart which shows that given information such as the minimum sized cluster of interest, and the maximum allowable overlap, clusters embodying such attributes may be found according to exemplary embodiments of the present invention. It should be appreciated that clustering algorithms may be employed in the cluster collecting process. According to one embodiment, clustering algorithms may be implemented utilizing platforms such as are described in the context FIG. 2.

Figure 2:
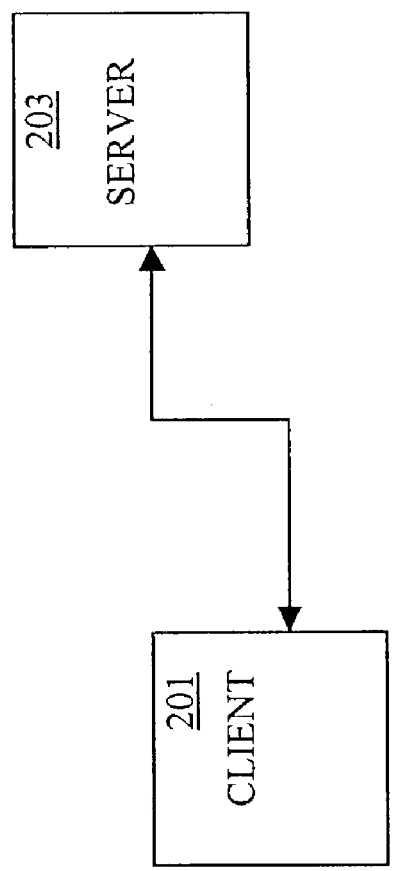
FIG. 2 is a block diagram representing a simplified client/server architecture according to exemplary embodiments of the present invention.

FIG. 2 is a block diagram 200 representing a simplified client/server architecture according to exemplary embodiments of the present invention. As shown in FIG. 2, a client 201 such as for example, a personal computer (PC) may be coupled via an intermediate connection to a server 203. According to exemplary embodiments, the clustering processes described herein may be performed on a platform similar to that shown in FIG. 2. According to one embodiment, application programs that include code that when executed perform the steps in the algorithms discussed herein with reference to FIGS. 3-6 may be resident in either the client 201 or server 203 system or both.

Although a simplified schematic diagram 200 is shown in FIG. 2 for purposes of clarity and explanation, it will be understood that the present invention is well suited to operation in a substantially more complex network environment including for example, multiple clients, multiple servers, multiple intermediate devices, the internet, local area networks (LANs), wide area networks (WANs), and various other network devices and the like.

Exemplary conjunctive Clustering Algorithms According to Embodiments of the Present Invention FIGS. 3-6 show flowcharts 300-600 of steps performed in algorithms of a conjunctive clustering process in accordance with one embodiment of the present. These flowcharts include processes of the present invention which, in one embodiment, are carried out by processors and electrical components under the control of computer readable and computer executable instructions. The computer readable and computer executable instructions reside, for example, in data storage components such as computer usable volatile memory and/or computer usable non-volatile memory (e.g. 704 and 706 described herein with reference to FIG. 7). However, the computer readable and computer executable instructions may reside in any type of computer readable medium. Although specific steps are disclosed in the aforementioned flowcharts, such steps are exemplary. That is, the present invention is well suited to performing various other steps or variations of the steps recited in Flowcharts 300-600. Within the present embodiment, it should be appreciated that the steps of the aforementioned flowcharts may be performed by software, by hardware or by any combination of software and hardware.

Algorithm Preliminaries

The problems addressed by embodiments of the present invention may be defined using a bipartite graph. Given a bipartite graph (see FIG. 1B) G=(U, W, E) and two subsets U'

⊆ U and W' ⊆ W, the subset of all edges between vertices in U' and vertices in W' may be denoted by E(U', W'). That is, E(U',W')={(u, w)∈E: u∈U', w∈W'}. The pair (U', W') may be referred to as a bisubgraph. It should be appreciated that for a vertex v the neighbor set of v may be denoted by Γ(v). For a subset S of vertices, according to exemplary embodiments, $\Gamma(S) = \cap_{v \in S} \Gamma(v)$ may denote the set of vertices that neighbor each vertex in S. For a subset S and a parameter ε such that $0<\epsilon<1$, $\Gamma_\epsilon(S)=\{w:|\Gamma(w) \cap S| \geq (1-\epsilon)|S|\}$ may denote the set of vertices that neighbor all but an ε-fraction of S.

According to exemplary embodiments of the present invention, a biclique may be described using a bipartite graph. According to such embodiments, given a bipartite graph G=(U, W, E), a bisubgraph (U',W') is a biclique if |E(U',W')|=|U'|·|W'|. That is, W'⊆Γ(U'). Moreover, the size (e.g., number of edges) of a biclique (U',W') may be described by |E(U', W')|=|U'|·|W'|. According to such embodiments, a maximum biclique is a biclique (U',W') for which |U'|·|W'| is maximized over all bicliques.

It should be appreciated that a maximum biclique (U*, W*) is maximal in the sense that for every vertex u∈U the bisubgraph (U*∪{u}, W*) is not a biclique and for every vertex w∈W the bisubgraph (U*, W*∪{w}) is not a biclique. Hence such a biclique may be uniquely determined by either side of the biclique. That is, if we have W* then U*=Γ(W*) and vice versa. According to exemplary embodiments, the set U of vertices corresponds to the points we want to cluster and the set W to the set of attributes that are used to describe the data points. This suggests that given the subset of attributes W*, the set of points U* may be completely determined using W*. According to one embodiment of the present invention, the difficulty associated with finding maximum bicliques may be avoided by relaxing the clustering requirement such that a clustering output is allowed to be close to biclique. The parameter "ε" which is useful in describing the extent of this closeness is discussed below.

According to exemplary embodiments, (U',W') may be ε-close to being a biclique, for $0 \leq \epsilon \leq 1$, if every vertex in U' neighbors at least (1−ε) of the vertices in W'. It should be appreciated that the bisubgraph (U', W') may be termed an ε-biclique. The size of an ε-biclique is |E(U', W')| (which is $\geq |U'| \cdot |W'|(1-\epsilon)$).

According to exemplary embodiments, in the context of conjunctive clustering, an ε-biclique may correspond to a pair (Y, c) such that every point in Y satisfies most (at least (1−ε)) of the attributes in c. It should be appreciated that the asymmetry between U' and W' apparent in the definition of ε-biclique presented above may be traced to the different roles played by the two sides of the ε-biclique in the clustering methodology employed by exemplary embodiments of the present invention. Similarly to what was noted above for bicliques, if an ε-biclique (U',W') is maximal then it may be determined by W'. That is, (U', W')=(Γ_ε(W'), W'). It should be appreciated that this may be especially useful in the context of clustering. In the above formulation where W'=c constitutes the description of the cluster, there may not be a need to output all points Y in the cluster as the ε-biclique may be determined from c.

Consider the case where given a bipartite graph G=(U, W, E), a subset W'⊆W is found such that the associated ε-biclique (Γ(W'),W') may be at least (1−bε) times as large as the maximum biclique for a small constant b. According to one embodiment, the sublinear result may include but is not limited to a value b=2. According to one embodiment, where time is linear in |U|, then the result may include but is not limited to a value b=0.

Collections of Large Bicliques.

According to exemplary embodiments, the above relaxation addresses the issue of finding a single approximate maximum biclique. The following discussion addresses the problem of finding a good collection of at most k bicliques, where k is a predetermined parameter. As in the case of a single biclique, preferably the bicliques in a clustered collection may be large. On the other hand, according to one embodiment, the number of bicliques in the collection should be bounded. Therefore, if there are several large bicliques that are very similar, according to one embodiment, only one of them may be included in the collection as a "representative", so as to allow the inclusion of other bicliques that may possibly be smaller and less similar but meet all the other biclique requirements.

The size issue alluded to above may be addressed utilizing two lower-bound parameters $\rho_U$ and $\rho_W$, which exemplary algorithms may be provided with according to one embodiment. Considering only bicliques (U',W'), according to exemplary embodiments:

$$|U'| \geq \rho_U |U| \text{ and } |W'| \geq \rho_W |W|.$$

In the conjunctive clustering formulation of exemplary embodiments of the present invention, these parameters flow naturally from the previous discussion since $\rho_W$ represents the minimum number of attributes a collection of points may have in common before a cluster may be considered (e.g., a cluster where the points have only one attribute in common may probably not be considered). Similarly $\rho_U$ represents the minimum number of points that may belong to a cluster in order for it to be considered. Consequently, according to exemplary embodiments, clusters that contain only a few points may not be considered. To help in the understanding of the discussion to follow $\beta(\rho_U, \rho_W)$ is designated to denote the set of all bicliques (U',W') in a bipartite graph G such that $$|U'| \geq \rho_U |U| \text{ and } |W'| \geq \rho_W |W|.$$

Moreover, the relationships provided in the following discussion define parameters useful in understanding the algorithms (discussed below) of exemplary embodiments of the present invention.

Consider the case where G=(U, W, E) is a bipartite graph and where U', U''⊆U and W', W''⊆W. Then according to exemplary embodiments (U', W') is a δ-cover of (U'', W'') if $|E(U'',W'') \setminus E(U',W')|/|E(U'',W'') \cup E(U',W')| \leq \delta$. That is, if the number of edges in E(U'',W'') that do not belong to E(U', W') is at most a δ fraction of the union of the two sets of edges.

It should be appreciated that this definition is asymmetric. As a result (U',W') may be a δ-cover of (U'',W'') but (U'', W'') may not be a δ-cover of (U', W'). For example this may be true when E(U'', W'') ⊂ E(U', W'), but the number of edges in E(U', W') that are not included in E(U'', W'') is large. The above definition may be extended to a collection of clusters in the following manner.

Consider the case where G=(U,W,E) is a bipartite graph and $C=\{(U_i,W_i)\}_{i=1}^k$ is a collection of pairs of vertex subsets where $U_i \subseteq U$, and $W_i \subseteq W$. Then, according to exemplary embodiments C (δ, ε)-dominates a pair (U', W') if either there exists a pair $(U_i, W_i) \in C$ that δ-covers (U', W'), or $|E(U',W')| \leq (1+\epsilon) \min_j \{|E(U_j', W_j')|\}$. According to one embodiment, a pair (U',W') may be dominated by C if there is a pair in C that covers (U', W') or if every pair in C is larger than (or about the same size as) (U', W'). Other relationships related to covering that are useful to the understanding of the herein described algorithms are discussed below.

Consider the case where G=(U, W, E) is a bipartite graph and where $C=\{(U_i,W_i)\}_{i=1}^k$ is a collection of pairs of vertex subsets where $U_i \subseteq U$, and $W_i \subseteq W$. According to exemplary embodiments, C is δ-diverse if for every two different pairs $(U_i, W_i)$ and $(U_j, W_j)$ in C, neither is a δ-cover of the other.

Given the preceding discussion it is apparent that we may find a collection of at most k bicliques in $\beta(\rho_U, \rho_W)$, that is both δ-diverse and (δ, ε)-dominates every $(U', W'') \in \beta(\rho_U, \rho_W)$. In the discussion that follows the clustering requirements are relaxed and the output of ε-bicliques are considered. To help in the understanding of the discussion to follow $\beta_\epsilon(\rho_U, \rho_W)$ is designated to denote the set of all ε-biclique $(U', W')$ in a bipartite graph G such that:

$|U'| \geq \rho_{U'}|U|$ and $|W'| \geq \rho_{W'}|W|$.

As a consequence, according to one embodiment of the present invention if G=(U, W, E) is a given bipartite graph and, $0 < \rho_U, \rho_W \leq 1$ are two size parameters, k an integer, $0 \leq \delta \leq 1$ a diversity/covering parameter, and $0 \leq \epsilon \leq 1$ an approximation parameter, a collection C of at most k ε-bicliques in $\beta_\epsilon(\rho_U, \rho_W)$ may be found such that C is δ-diverse and for every $(U', W') \in \beta(\rho_U, \rho_W)$, $(U', W')$ is (b (δ+ε), b'ε)-dominated by C for some small constants b and b'.

It should be appreciated that it may be sufficient that the algorithm output only the subset $W' \subseteq W$ in each ε-biclique $(U', W')$. According to one embodiment, the sublinear result may include but is not limited to values b=4 and b'=2. In such cases where time is linear in |U| then, according to one embodiment the result may include but is not limited to values b=3 and b'=0.

Seed Algorithm

Figure 3:
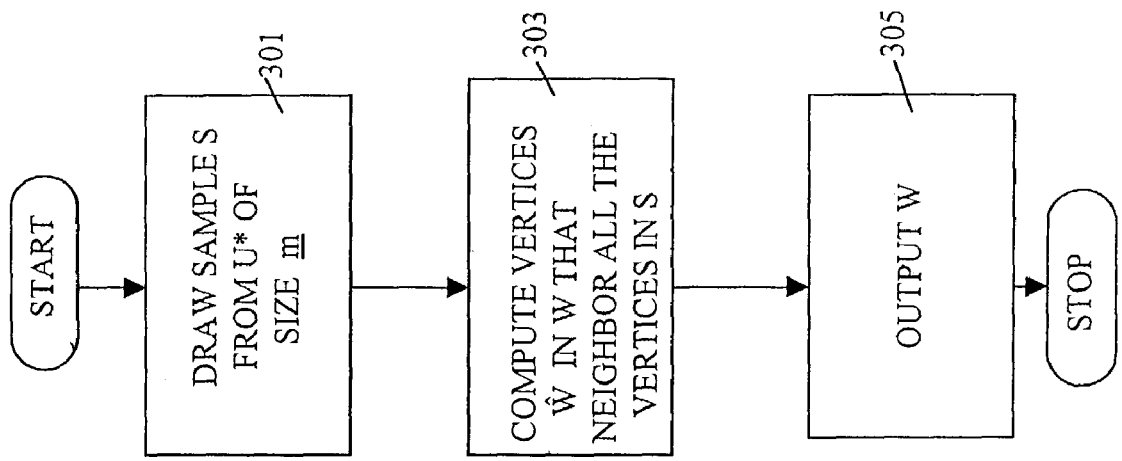
FIG. 3 is a flowchart of the steps performed in a good seed algorithm according to embodiments of the present invention.

According to one embodiment of the present invention, a building block component of the algorithms of the present invention may be termed a "seed algorithm". Given a fixed biclique $(U^*, W^*)$ that is maximal, $W^*$ may be obtained by simply considering $\Gamma(U^*)$ if $U^*$ is known. U' could then be obtained by considering $\Gamma(\Gamma(U^*))$. However, as $U^*$ may not be so easily ascertainable, according to one embodiment, a (small) random sample S may be obtained from $U^*$ to reach special results. For example, for every sample $S \subseteq U$, $W^*$ may be contained in $\Gamma(S)$. However, $\Gamma(S)$ may contain many additional vertices outside of $W^*$. As a consequence, if $\Gamma(\Gamma(S))$ is ascertained a very small subset (or even an empty set) may be found. However, if $\Gamma_\epsilon(\Gamma(S))$ is ascertained, then with high probability over the choice of a sufficiently large sample S, the ε-biclique $(\Gamma_\epsilon(\Gamma(S)), \Gamma(S))$ may be at least as large as the biclique $(U^*, W^*)$. And, according to exemplary embodiments, the sample S may be a "good seed" for the biclique $(U^*, W^*)$. As is described below with reference to FIG. 4A, processes for obtaining the good seed other than a direct sampling from $U^*$ may be employed. Assuming we can directly sample for $U^*$, FIG. 3 is a flowchart of the steps that may be performed in a good seed clustering algorithm according to one embodiment of the present invention. In the following algorithm discussion $\rho_W$ is a lower bound on $|W^*|/|W|$, and $\underline{m}$ is the sample size.

At step 301, a sample is drawn from $U^*$ of size $\underline{m}$. This may be represented algorithmically by the relationship:

S ← sample from $U^*$ of size $\underline{m}$.

At step 303, the set of vertices in W (denoted $\hat{W}$) that neighbor all of the vertices in S is computed. This may be represented algorithmically by the relationship:

$\hat{W} \leftarrow \Gamma(S)$

At step 305, $\hat{W}$ is outputted.

In one embodiment, if $\underline{m} = 16/\epsilon^2 \log 40/\rho_W \epsilon$, then with probability of at least 9/10 over the choice of $S \subset U^*$, the seed algorithm finds a bisubgraph with at least as many edges as the optimum biclique: $|E(\Gamma_\epsilon(\hat{W}), \hat{W})| \geq |U^*| \cdot |W^*|$.

In order to understand the foregoing relationship, it may be helpful to partition the vertices in $\hat{W}$, i.e., the intersection of the neighbors of S, into those that are in the optimum biclique $W^*$, those that neighbor a significant fraction of $U^*$ ("H", for high degree) and those that do not ("L", for low degree). It should be appreciated that since S is a subset of $U^*$, $\hat{W}$ may contain all of $W^*$. In addition, it may be shown that with high probability there are very few "L" vertices. Consequently, since most of the vertices in $\hat{W}$ are either in the optimum biclique or have high degree with $U^*$, it is submitted that the bisubgraph $(\Gamma_\epsilon(\hat{W}), \hat{W})$ has at least as many edges as the optimum biclique. The terms "high degree" and "low degree" may be defined by the following:

A vertex w∈W has "high degree" with respect to $U^*$ if $|\Gamma(w) \cap U^*|/|U^*| \geq 1 - (\epsilon/4)^2$. Otherwise it has "low degree" with respect to $U^*$.

It should be appreciated that in particular, every w∈$W^*$ has "high" degree with respect to $U^*$ (since for every w∈$W^*$, $|\Gamma(w) \cap U^*|/|U^*| = 1$). According to one embodiment, the samples of interest are the samples of $U^*$ that are "good seeds": a sample S so that $\Gamma(S)$ contains $W^*$ plus mostly vertices that have high degree with respect to $U^*$.

According to exemplary embodiments, a subset $S \subseteq U^*$ is a good seed of $U^*$ if the number of vertices in $\Gamma(S) \subseteq W$ that have low degree with respect to $U^*$ is at most $(\epsilon/4) |W^*|$. It should be appreciated that according to one embodiment with a probability of at least 9/10 the sample S is a good seed of $U^*$.

Further, it should be appreciated that if S is a good seed of $U^*$ then the ε-biclique $(\Gamma_\epsilon(\hat{W}), \hat{W}) = (\Gamma_\epsilon(\Gamma(S)), \Gamma(S))$ has as many edges as $(U^*, W^*)$.

Consider the case where $\hat{W}$ is constructed in the good seed algorithm on a sample S of size $\underline{m}$ drawn from $U^*$. If S is a good seed of $U^*$ then $(\Gamma_\epsilon(\hat{W}), \hat{W})$ is an ε/4-cover of $(U^*, W^*)$ and $|E(\Gamma_\epsilon(\hat{W}), \hat{W})| \geq |U^*| \cdot |W^*|$.

Maximum Biclique Approximating Algorithm

According to exemplary embodiments, a maximum conjunctive cluster is a cluster/biclique $(U^*, W^*)$ with the most edges. Because finding such clusters may be difficult, according to exemplary embodiments a relaxation may be allowed that facilitates the outputting by an algorithm that produces a cluster that is ε-close to being a strict conjunctive cluster/biclique. According to exemplary embodiments, each point in $\hat{U}$ has at least (1−ε) of the attributes in $\hat{W}$. More precisely, the algorithm may output $\hat{W}$ (which corresponds to the cluster description), and $\hat{U}$ may be implicitly determined with reference to $\hat{W}$ ($\hat{U}$ contains the vertices in U that neighbor at least 1−ε of the vertices in $\hat{W}$). According to exemplary embodiments, such bicliques are termed ε-bicliques.

According to exemplary embodiments, the algorithm of the present invention operates most efficiently when the fraction of points located in both $U^*$ and $W^*$ are sufficiently large. That is if the length of the conjunction and the number of points that satisfy the conjunction is large.

If $|U^*| \geq \rho_{U'}|U|$ and $|W^*| \geq \rho_{W'}|W|$, for certain size parameters $0 < \rho_U, \rho_W \leq 1$, then the algorithm of the present invention draws a sample of size polynomial in all input parameters, and runs in time linear in |W|, independent of |U|, quasi polynomial in $1/\rho_U$ and $1/\rho_W$, and exponential in $\log(1/\epsilon)/\epsilon^2$. It should be appreciated that it may not be expected that polynomial dependence exist in all parameters $1/\epsilon$, $1/\rho_U$, $1/\rho_W$. If such were the case an algorithm may be employed to solve the original (already known to be difficult) maximum edge-biclique problem in polynomial time by setting $\epsilon < 1/(|U| |W|)$.

Given $\rho_U$ and $\rho_W$ (for which $\beta(\rho_U, \rho_W)$ is non-empty) the discussion that follows describes how an $\epsilon$-biclique may be found in which the number of edges included therein may be almost as large as the number of edges included in a maximum biclique in $\beta(\rho_U, \rho_W)$ The processes described in the following discussion may also be used to identify k conjunctive clusters. In the processes described, as a direct sampling from the left-hand-side U* of a maximum biclique may not be performed (since it is unknown), instead a sample from U is taken, and consideration is given to all subsets of size roughly $\underline{m}$ (as defined in the Good Seed Algorithm described above). In some embodiments, where m and $\underline{m}$ have the appropriate sizes it can be shown that, with high probability, at least one of these subsets S may be contained within U* and furthermore, S may be a good seed of U*. In particular, for this subset S, the $\epsilon$-biclique $(\Gamma_\epsilon(\Gamma(S)), \Gamma(S))$ may have at least as many edges as the maximum strict biclique (U*, W*).

Figure 4A:
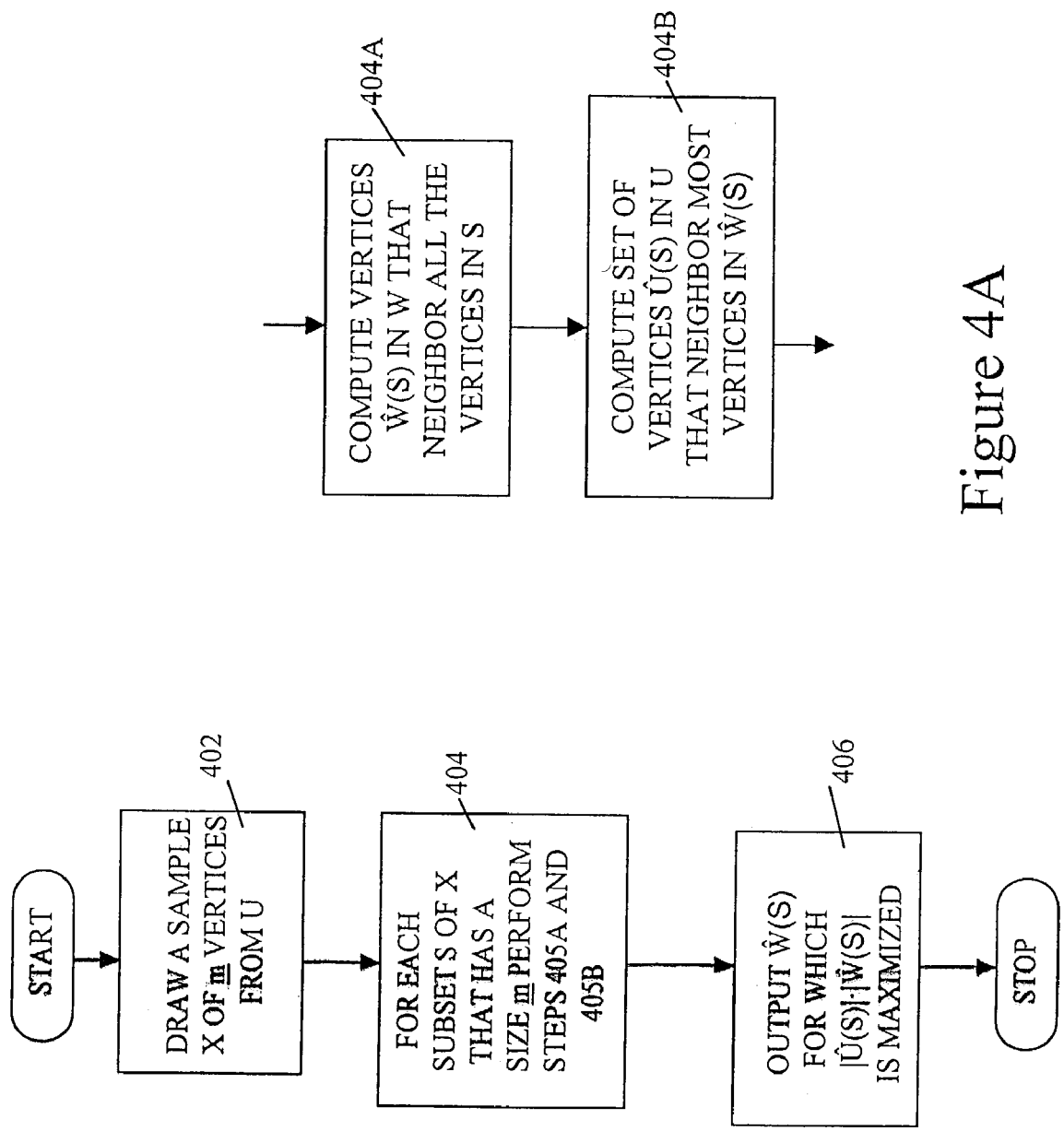
FIG. 4A is a flowchart of the steps performed in a method for approximating a maximum biclique according to embodiments of the present invention.

FIG. 4A is a flowchart of the steps performed in an algorithm for approximating a maximum biclique according to one embodiment of the present invention. This maximum biclique approximating algorithm may be executed as follows:

At step 402, a sample X of m vertices is drawn uniformly and independently from U after having identified U and W.

At step 404, for each subset S of X that has size $\underline{m}$ execute the following operations:

At step 404A, compute a set of vertices $\hat{W}$ in W that neighbor all the vertices in S (e.g., identify a subgroup $\hat{W}$ in W that shares an intersection with all of the points in S). This operation may be represented algorithmically by the relationship:

$\hat{W}(S) \leftarrow \Gamma(S)$

At step 404B, compute a set of vertices $\hat{U}(S)$ that neighbor most of $\hat{W}(S)$
(e.g., identify a sub group $\hat{U}(S)$ in U that shares an intersection with most of the points in $\hat{W}(S)$). This may be represented algorithmically by the relationship:

$\hat{U}(S) = U \cap \Gamma_\epsilon(\hat{W}(S))$

At step 406, output $\hat{W}(S)$ for which $|\hat{U}(S)| \cdot |\hat{W}(S)|$ is maximized.

The preceding method, however, comes at a cost linear in |U|, while some embodiments of the present invention may rely on an algorithm that does not depend on |U| (where U corresponds to the points we want to cluster) but only on |W| (the set of attributes). Consequently, according to some embodiments, additional sampling from U may be used in order to approximate the size of $\Gamma_\epsilon(\Gamma(S))$.

Figure 4B:
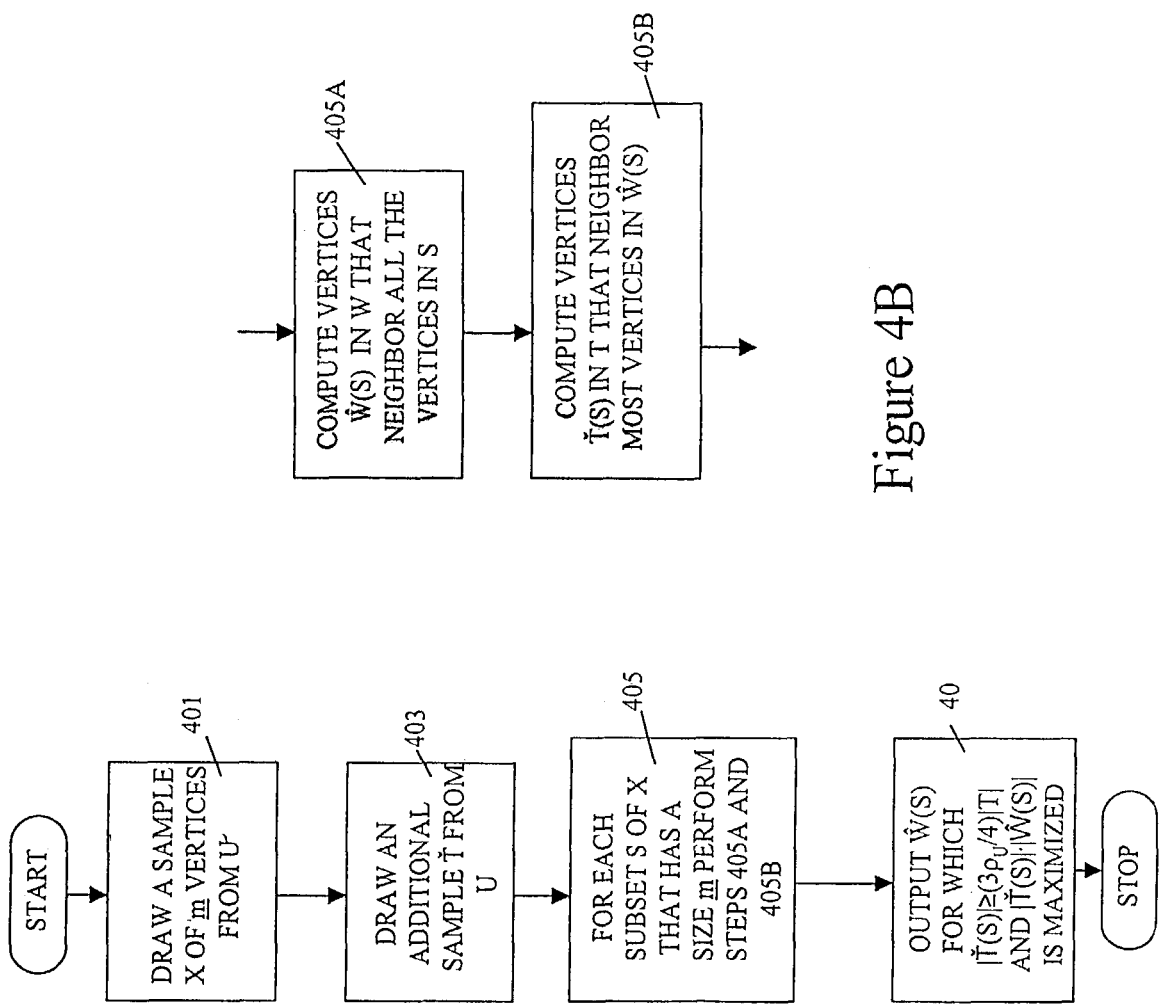
FIG. 4B is a flowchart of the steps performed in another method for approximating a maximum biclique according to embodiments of the present invention that may have a faster running time than the method in FIG. 4A.

FIG. 4B is a flowchart of the steps performed in an algorithm for approximating a maximum biclique according to one embodiment of the present invention. If $\underline{m}$ is defined as described in the description of the good seed algorithm and if $m = 2/\rho_U \cdot \underline{m}$, and $t = 32/(\rho_U \rho_W \epsilon^2) \cdot \underline{m}$ then a maximum biclique approximating algorithm may be executed as follows:

At step 401, a sample X of m vertices is drawn uniformly and independently from U after having identified U and W.

At step 403, an additional sample T of t vertices is uniformly and independently drawn from U.

At step 405, for each subset S of X that has size $\underline{m}$ execute the following operations:

At step 405A, compute a set of vertices $\hat{W}$ in W that neighbor all the vertices in S. This operation may be represented algorithmically by the relationship:

$\hat{W}(S) \leftarrow \Gamma(S)$

At step 405B, compute a set of vertices $\check{T}(S)$ in T that neighbor most of $\hat{W}(S)$. This may be represented algorithmically by the relationship:

$\check{T}(S) = T \cap \Gamma_\epsilon(\hat{W}(S))$

At step of 407, output $\hat{W}(S)$ for which $|\check{T}(S)| \geq (3\rho_U/4)|T|$ and $|\check{T}(S)| \cdot |\hat{W}(S)|$ is maximized.

Note that in the above embodiment the running time of the method is linear in |U|. We now describe a method with running time independent of |U|.

According to exemplary embodiments, with a probability of at least 2/3 the algorithm for approximating a maximum biclique outputs a subset $\hat{W} = \hat{W}(S)$ such that $|E(\Gamma_\epsilon(\hat{W}), \hat{W})| \geq (1 - 2\epsilon) \cdot \rho^* \cdot |U| \cdot |W|$ where $\rho^* |U| |W|$ is the number of edges in the maximum biclique. According to some embodiments, the running time of the algorithm is exponential in $\log(1/\epsilon)/\epsilon^2$, quasi-polynomial in $1/\rho_U$ and $1/\rho_W$, linear in |W| and independent of |U|.

Conjunctive Clustering Collection Algorithm

One embodiment of the present invention involves identifying a collection of large conjunctive clusters. According to exemplary embodiments, the k best conjunctive clusters are the largest conjunctive clusters that do not excessively overlap. Given size parameters $0 < \rho_U, \rho_W \leq 1$ and given k (the number of clusters) according to exemplary embodiments an algorithm may be produced that outputs k subsets $\hat{W} \subseteq W$ for which the following holds:

$|\hat{W}| \geq \rho_W \cdot |W|; |\hat{U}| \geq \rho_U \cdot |U|$ (where $\hat{U}$ is as defined above given $\hat{W}$); the different $\epsilon$-bicliques $(\hat{U}, \hat{W})$ do not overlap too much in terms of edges. Further, for every true conjunctive cluster (U', W') such that $|U'| \geq \rho_U \cdot |U|$ and $|W'| \geq \rho_W \cdot |W|$, either there is a $\epsilon$-cluster in our collection that approximately covers (U', W') or (U', W') is smaller than each $\epsilon$-cluster in the collection. According to exemplary embodiments, the running time of the algorithm is quasi polynomial in k, $1/\rho_U$ and $1/\rho_W$, exponential in $\log(1/\epsilon)/\epsilon^2$, linear in |W|, and independent of |U|.

Moreover, according to exemplary embodiments of the present invention, algorithms constructed in accordance with embodiments in the present invention may be adapted to ascertain large $\epsilon$-bicliques. This may be useful when there is no large perfect conjunctive cluster, but there are large $\epsilon$-clusters. According to one embodiment, the modified algorithm adapted to produce this result will output an $O(\epsilon^{1/3})$-biclique that may almost be as large as the largest $\epsilon$-biclique.

As previously mentioned, given $\rho_U, \rho_W, k, \epsilon$, and $\delta$ exemplary embodiments of the present invention may output a collection $\hat{C}$ of k $\epsilon$-bicliques that is $\delta$-diverse and that $(b(\delta+\epsilon), b'\epsilon)$-covers every biclique in $\beta(\rho_U, \rho_W)$ for small constants b an b'.

Figure 5:
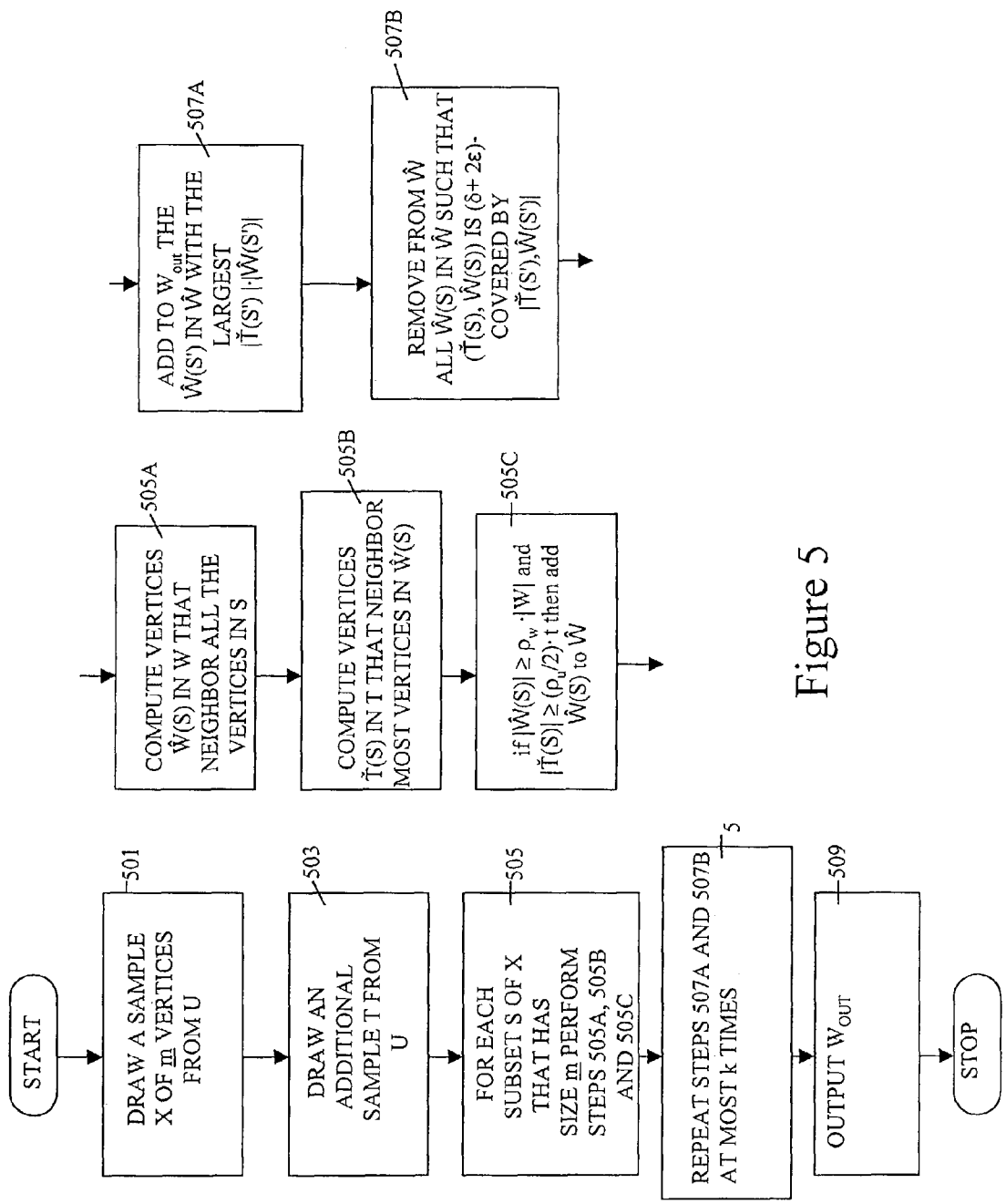
FIG. 5 is a flowchart of the steps performed in a conjunctive clustering algorithm according to embodiments of the present invention.

According to exemplary embodiments, for purposes of the following discussion $\underline{m}$, m and t may be reset as follows: $\underline{m} = \Theta(1/\epsilon \log k/\rho_W \epsilon)$, $m = 2 \log k/\rho_U \cdot \underline{m}$, and $t = \Theta(\log(1/\epsilon)/\rho_U \rho_W \epsilon^3) \cdot \underline{m}$. FIG. 5 is a flowchart of the steps performed in a conjunctive clustering algorithm according to one embodiment of the present invention.

At step 501, a sample X of m vertices is drawn uniformly and independently from U.

At step 503, an additional sample T of t vertices is uniformly and independently drawn from U.

Let $\hat{W} \leftarrow \phi$.

At step 505, for each subset S of X that has size m execute the following operations:

At step 505A, compute the set of vertices in W that neighbor all the vertices in S. This operation may be represented algorithmically by the relationship:

$\hat{W}(S) \leftarrow \Gamma(S)$

At step 505B, compute a set of vertices $\check{T}(S)$ in T that neighbor most of $\hat{W}(S)$. This may be represented algorithmically by the relationship:

$\check{T}(S) = T \cap \Gamma_\epsilon(\hat{W}(S))$

At step 505C, if $|\hat{W}(S)| \geq \rho_W \cdot |W|$ and $|\check{T}(S)| \geq (\rho_U/2) \cdot t$ then add $\hat{W}(S)$ to $\hat{W}$.

At step 507, steps 507A and 507B are repeated at most k times. At step 507A, the $\hat{W}(S')$ in $\hat{W}$ with the largest $|\check{T}(S'), \hat{W}(S')|$ is added to $W_{out}$. At step 507B all $\hat{W}(S)$ in $\hat{W}$ such that $(\check{T}(S), \hat{W}(S))$ $(\delta+2\epsilon)$-covers $|\check{T}(S'), \hat{W}(S')|$ are removed from $\hat{W}$. At step 508, the algorithm outputs $W_{out}$.

According to exemplary embodiments of the present invention, if $C = \{(U_i^*, W_i^*)\}_{i=1}^k$ is a fixed collection of bicliques in $\beta(\rho_U, \rho_W)$, with a probability of at least 9/10 over the choice of the samples from U, for every $(U_i^*, W_i^*) \in C$ there exists a subset $\hat{W}(S) \in W_{out}$ such that $(\Gamma_\epsilon(\hat{W}(S)), \hat{W}(S))$ is an $(\epsilon/4)$-cover of $(U_i^*, W_i^*)$ and furthermore, $|E(U(S), \hat{W}(S))| \geq |U_i^*| \cdot |W_i^*|$.

According to at least one embodiment, with a probability of at least, 4/5, the conjunctive clustering algorithm outputs a collection W of at most k $\epsilon$-bicliques such that $\hat{C} = \{(\Gamma_\epsilon(\hat{W}), \hat{W}) : \hat{W} \in W\}$ is $\delta$-diverse, and $\hat{C}$ $((2\delta+4\epsilon), 2\epsilon)$-dominates every biclique in $\beta(\rho_U, \rho_W)$. According to one embodiment, the running time of the algorithm is exponential in log $1/\epsilon/\epsilon^2$, quasi-polynomial in k, $1/\rho_U$, and $1/\rho_W$, linear in $|W|$ and independent of $|U|$.

According to at least one embodiment of the present invention a heuristic variant of the algorithm can be implemented to perform numerous experiments on real data. One example of embodiments of the present invention is the discovery of product bundles among on-line shopping customers. According to some embodiments, U corresponds to products, and W corresponds to customers, with an edge linking u to w if customer w purchased product u. A conjunctive cluster is a group of products and many customers typically purchase together; hence a potential product bundle. In another embodiment, this method may also be applied to clickstreams to discover related web pages. In this embodiment, U corresponds to web pages and W corresponds to clickstream sessions (or users) with an edge connecting a u to w if the web page u was clicked in session (or by user) w. A conjunctive cluster is a group of web pages that are commonly clicked by many users.

Data Streams

According to exemplary embodiments, a data stream is a sequence of points $u_1 \ldots u_i, \ldots u_{|U|}$ that may be read once in increasing order of indices i. In many applications, the notion of a data stream may be more appropriate than a static data set, e.g., telecommunications, web clickstreams. According to at least one embodiment of the present invention, an algorithm that stores a sketch of a stream that is sufficient to identify conjunctive clusters is presented. Accordingly, if the data is actually arriving in sequenced chunks $C_1, \ldots, C_j$ where each $C_i$, is a collection of points, then the size of the sketch is quasi-polynomial in $j/\rho_U$ and $j/\rho_W$, linear in $|W|$, and log(1/$\epsilon$)/$\epsilon^2$.

Embodiments of the present invention have addressed clustering a static data set in time independent of the number of data points. However, exemplary embodiments of the present invention may also address clustering a dynamic stream where, in contrast, each point in the stream must be read once but because of memory limitations the entire stream cannot be maintained in main memory. As previously mentioned, a data stream is a sequence of points $u_1, \ldots, u_i, \ldots u_{|U|}$ that can be read only once in increasing order of the indices i. According to exemplary embodiments, a data stream is a more fitting model when a large volume of data is continuously arriving and it may not be feasible to store all the data. According to exemplary embodiments, the performance of an algorithm that operates on data streams may be measured by the amount of information it stores in main memory and the quality of the solution it finds.

Embodiments of the present invention present conjunctive clustering in the agglomerative model, where the objective is to output the best conjunctive clusters based on all the data collected up to a point in time (as opposed to a window). According to at least one embodiment, the conjunctive clustering algorithm may be extended to k clusters.

According to exemplary embodiments, even though data may stream by one point at a time, clustering may be performed at discrete portions, e.g., in customer segmentation applications. According to at least one embodiment, if the portions of the stream are denoted $C1, \ldots, Cj$ it should be appreciated that the optimum biclique may drift from one portion of the stream to the next. The optimum bicliques associated with the portions $C_1 \cap \ldots \cap C_i$, for $i = 1, \ldots, j$ may be denoted $(U_i, W_i)$.

According to exemplary embodiments, an algorithm for identifying an optimum biclique from streaming data is presented that features the maintenance of an X and T random sample of the data stream, as in the algorithm for approximating a maximum biclique, although with a slightly larger sample (to account for the fact that there might be j different optimum bicliques). According to exemplary embodiments, the aforementioned approach provides that at each portion the algorithm will have presented a biclique that has boundably fewer edges than the optimum.

However, because exemplary embodiments require the reading of each point in the stream, optimized results may be attained by employing an alternate methodology. According to some alternate embodiments, optimized results may be attained by applying the aforementioned good seed algorithm starting from W (i.e., by sampling from the attributes, and maintaining statistics for sub samples of the sampled attributes). It should be appreciated that at any chunk in the stream, this approach will yield a biclique with at least as many edges as the optimum biclique (as opposed to boundably fewer).

Consider the case where X is a sample of vertices drawn from W. According to one embodiment, for each subset S of X of a specified size, the stream algorithm may maintain the set of attributes S, the number of points z(S) that have streamed by that are in $\Gamma(S)$, and count($w_i$, S) the number of points that have streamed by in $\Gamma(S)$ that satisfy the attribute $w_i$. According to exemplary embodiments at any portion a relaxed edge biclique may be outputted by determining $W_S$ for each subset S and by outputting the biclique corresponding to the subset S with the most edges.

Figure 6:
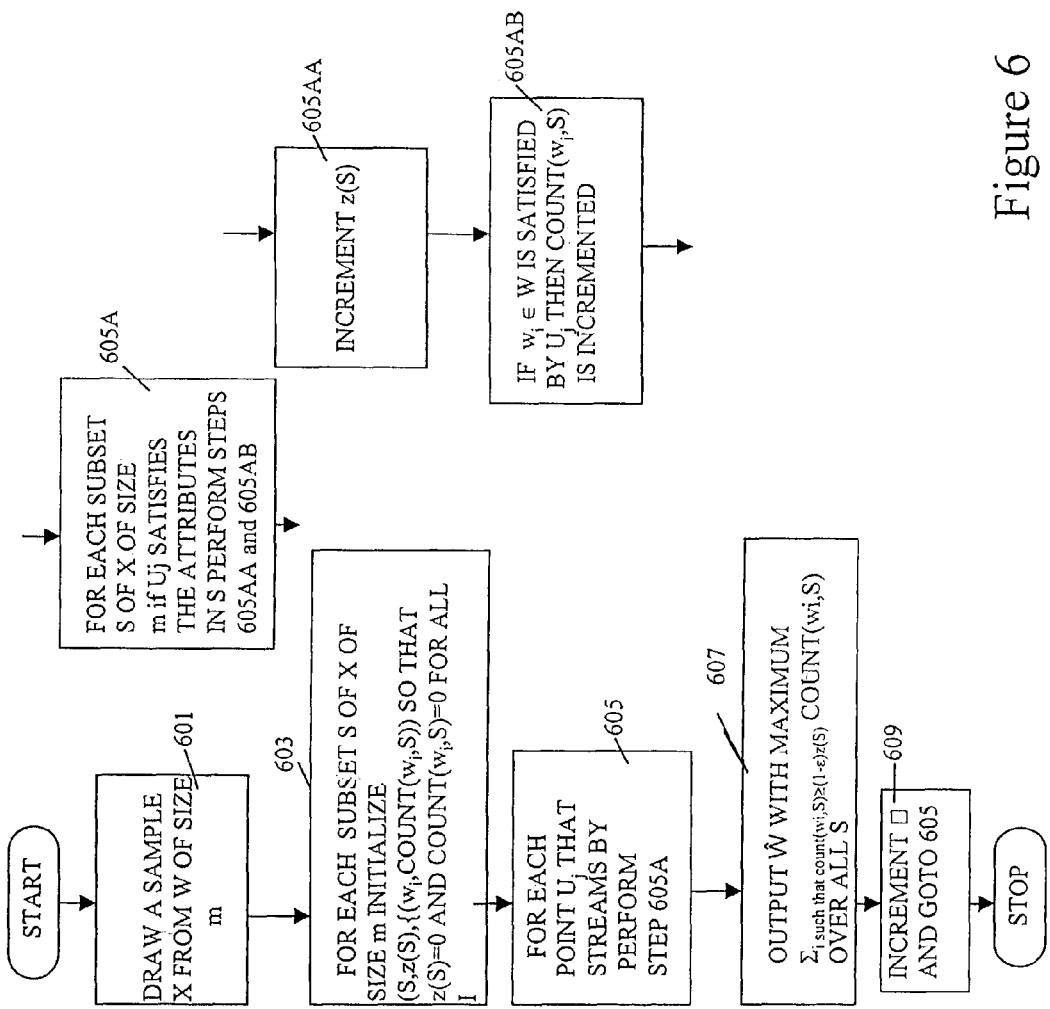
FIG. 6 is a flowchart of the steps performed in a stream approximate maximum edge biclique algorithm according to embodiments of the present invention.

According to one embodiment, these are the vertices $w_i$ in W for which count($w_i$, S) $\geq (1-\epsilon)z(S)$. FIG. 6 is a flowchart of the steps performed in a stream approximate maximum edge biclique algorithm according to one embodiment of the present invention. In the following discussion $\underline{m} = \Theta(1/\epsilon^2 \log j/\rho_U \epsilon)$ and $m = 2 \log j/\rho_W \underline{m}$.

At step 601, a sample is drawn from W of size m. This step may be represented algorithmically by the relationship:

X←sample from W of size m; l←1.

At step 603, $(S, z(S), \{(w_i, count(w_i,S)), i=1, \ldots, |W|\})$ is initialized for each subset S of X of size m. This step may be represented algorithmically by the relationship:

z(S)←0 for all subsets S of X of size m count
$(w_i,S)$←0 for all i=1, ..., |W| and for all subsets
S of size m At step 605, for each point $U_j$ in portion $C_l$ that streams by and for each subset S of X, if $U_j$ satisfies the attributes in the subset S then:
   At step 605A, increment z(S).
   At step 605B, if $w_i \epsilon W$ is satisfied by $u_j$ then $count(w_i,S)$ is incremented.

At step 607, the best biclique is outputted: For a given subset S of X, $\hat{W}_S$ is the vertices for which $count(w_i,S) \geq (1-\epsilon)z(S)$. According to exemplary embodiments, over all subsets S of X, the conjunctive description $\hat{W}_S$ is output with maximum count $\Sigma_{i\ in\ \hat{w}.sub.S}\ count(w_i,S)$.

At step 609, clustering operations proceed to the next chunk by incrementing l and returning to step 605.

Consider the case where $(U_l, W_l)$ is the optimum biclique for the chunks $C_1 \cap \ldots \cap C_l$. According to at least one embodiment, where $S_l$ is the subset of X that yields $W_{Sl}$ (the output of the stream algorithm after the chunks $C_1, \ldots, C_l$,) then with a probability of at least 2/3, $|E(\hat{U}_l,\hat{W}_l)| \geq |E(U_l, W_l)|$. It should be appreciated that the amount of memory used by the algorithm is quasi-polynomial in $j/\rho_U$ and $j/\rho_W$, exponential in $\log(1/\epsilon)/\epsilon^2$, and linear in |W|.

Exemplary Hardware in Accordance with Embodiments of the Present Invention

Figure 7:
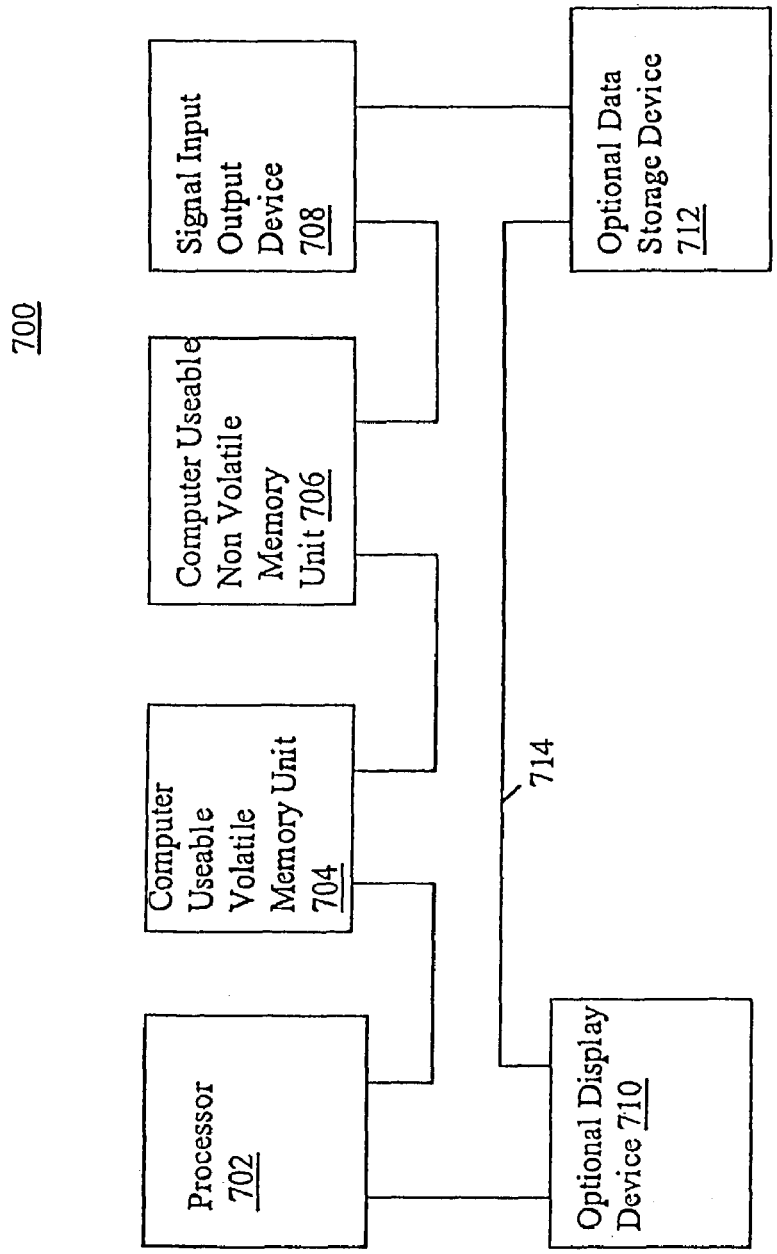
FIG. 7 is a block diagram of an embodiment of an exemplary computer system according to embodiments of the present invention.
Figure 5:
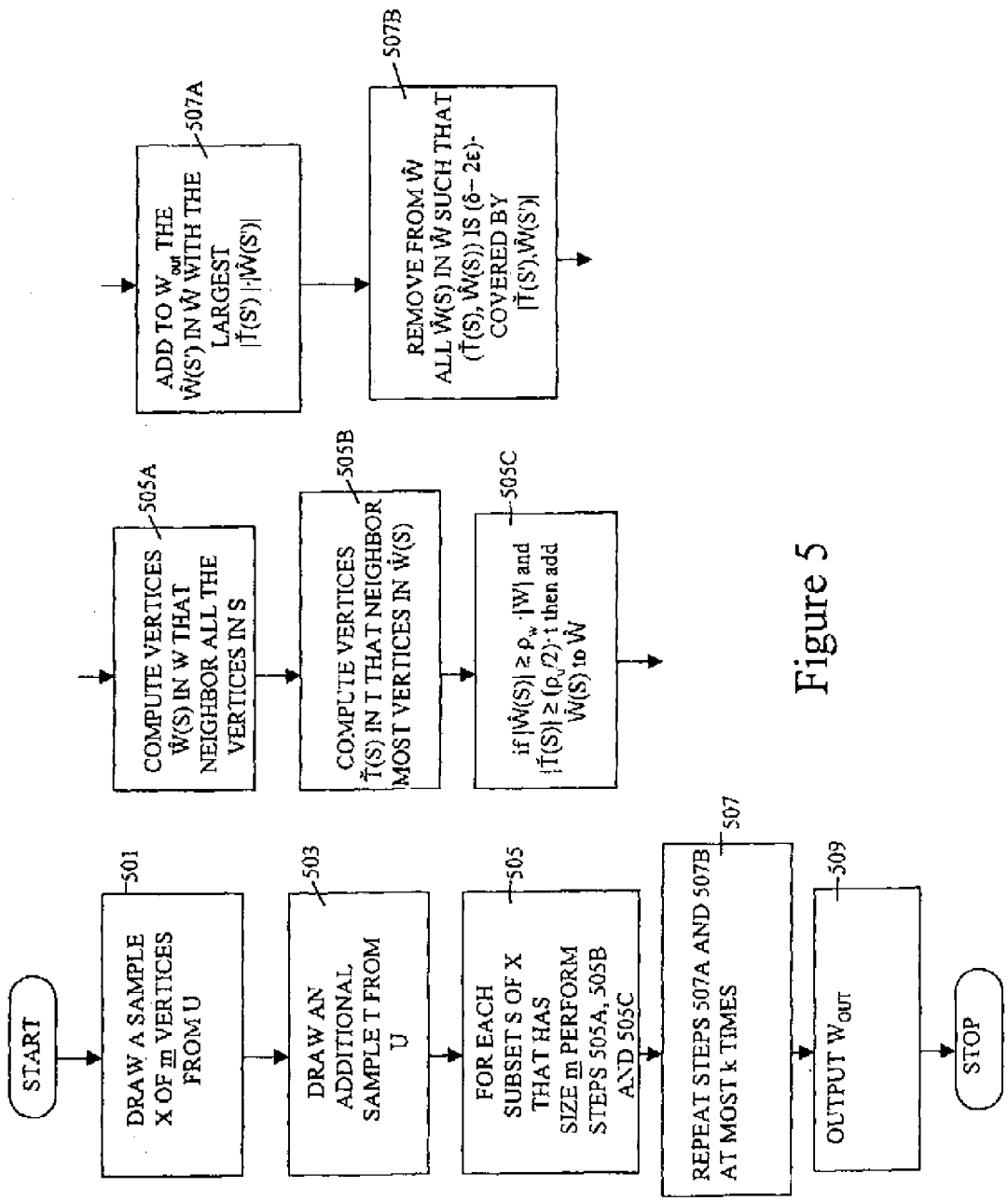

FIG. 7 is a block diagram of an exemplary computer system 700 in accordance with embodiments of the present invention. It should be appreciated that system 700 is not strictly limited to be a computer system. As such, system 700 may be well suited to be any type of computing device (e.g., server computer, portable computing device, etc.). Within the following discussions, certain processes and steps are discussed that are realized, in some embodiments, as a series of instructions (e.g., software program) that reside within computer readable memory units of computer system 700 and executed by a processor(s) of system 700. When executed, the instructions cause computer 700 to perform specific actions and exhibit specific behavior which is described in detail below. According to one embodiment, the instructions may include code that when executed perform the steps in the algorithms discussed herein with reference to FIGS. 3-6. It should be appreciated that these instructions may be resident in either a client (e.g., 201) or server (e.g., 203) system or both.

Computer system 700 of FIG. 7 may comprise an address/data bus 714 for communicating information and one or more central processors 702 coupled with bus 714 for processing information and instructions. Central processor unit 702 may be a microprocessor or any other type of processor. The computer 700 also may include data storage features such as a computer usable volatile memory unit 704 (e.g., random access memory, static RAM, dynamic RAM, etc.) coupled with bus 714 for storing information and instructions for central processor(s) 702, a computer usable non-volatile memory unit 706 (e.g., read only memory, programmable ROM, flash memory, EPROM, EEPROM, etc.) coupled with bus 714 for storing static information and instructions for processor(s) 702. System 700 also may include one or more signal generating and receiving devices 708 coupled with bus 714 for enabling system 700 to interface with other electronic devices. The communication interface(s) 708 of the present embodiment may include wired and/or wireless communication technology. For example, in some embodiments, the communication interface 708 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

The system 700 may also include a computer usable mass data storage device 712 such as a magnetic or optical disk and disk drive (e.g., hard drive or floppy diskette) coupled with bus 714 for storing information and instructions. An optional display device 710 may be coupled to bus 714 of system 700 for displaying video and/or graphics. It should be appreciated that optional display device 710 may be a cathode ray tube (CRT), flat panel liquid crystal display (LCD), field emission display (FED), plasma display, or any other display device suitable for displaying video and/or graphic images and alphanumeric characters recognizable to a user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

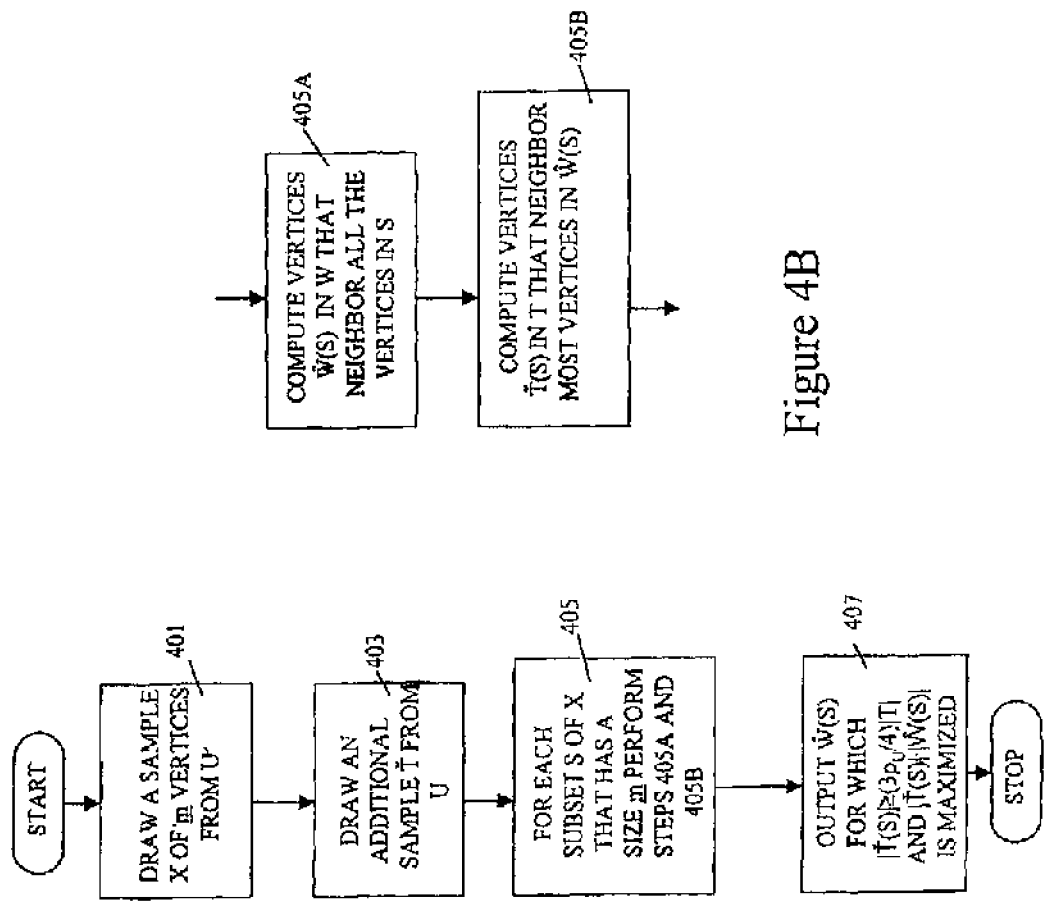

What is claimed is:

1. A computer implemented method for finding conjunctive clusters comprising:
   identifying a first group of points, wherein said first group of points is electronic data;
   identifying a second group of points, wherein said second group of points is electronic data;
   randomly drawing a first sample from said first group of points of a first predetermined size; and
   identifying subsets of said first sample;
   for each subset of said first sample of a second predetermined size perform steps comprising;
   identifying a subgroup of said second group of points that share an intersection with all of the points in said first sample of points;
   identifying a subgroup of said first group of points that share an intersection with a specified number of the points in said subgroup of said second group of points; and
   outputting a third group of points wherein the product of the magnitude of said subgroup of said second group and the magnitude of said subgroup of said first group is maximized, wherein one or more conjunctive clusters are found.

2. The computer implemented method of claim 1, further comprising drawing a second sample from said first group of points wherein said subgroup of said first group of points is identified from said second sample.

3. The computer implemented method of claim 2, wherein said second group of points represent attributes.

4. The computer implemented method of claim 3, wherein said third group represents a biclique or conjunctive cluster.

5. The computer implemented method of claim 4, wherein said conjunctive cluster represents overlapping clusters.

6. The computer implemented method of claim 5, wherein each of said points belongs to multiple clusters.

7. The computer implemented method of claim 6, wherein each of said attributes is used to describe multiple clusters.

8. The computer implemented method of claim 7, wherein a point is not clustered if it does not fall into a specified number of largest clusters in a set of clusters.

9. The computer implemented method of claim 8, wherein an entire dataset is not read into a main memory.

10. The computer implemented method of claim 4 further comprising the step of:
    collecting a plurality of bicliques.

11. A computer useable storage medium having computer useable code embodied therein causing a computer to perform operations comprising:
    determining a first group of points in a conjunctive clustering process;
    determining a second group of points in a conjunctive clustering;
    randomly selecting a first sample from said first group of points of a first predetermined size; and
    identifying subsets of said first sample;
    for each subset of said first sample of a second predetermined size perform steps comprising:
        determining a subgroup of said second group of points that share an intersection with all of the points in said first sample of points;
        determining a subgroup of said first group of points that share an intersection with a specified number of the points in said subgroup of said second group of points; and
        outputting a third group of points wherein the product of the magnitude of said subgroup of said second group and the magnitude of said subgroup of said first group is maximized, wherein one or more conjunctive clusters are found.

12. The computer useable storage medium of claim 11, further comprising drawing a second sample from said first group of points wherein said subgroup of said first group of points is identified from said second sample.

13. The computer useable storage medium of claim 12, wherein said second group of points represent attributes.

14. The computer useable storage medium of claim 13, wherein said third group represents a biclique or conjunctive cluster.

15. The computer useable storage medium of claim 14, wherein said conjunctive cluster represents overlapping clusters.

16. The computer useable storage medium of claim 15, wherein each of said points belongs to multiple clusters.

17. The computer useable storage medium of claim 16, wherein each of said attributes is used to describe multiple clusters.

18. The computer useable storage medium of claim 17, wherein a point is not clustered if it does not fall into a specified number of largest clusters in a set of clusters.

19. The computer useable storage medium of claim 18, wherein an entire dataset is not read into a main memory.

20. The computer useable storage medium of claim 14 further comprising the step of:
    collecting a plurality of bicliques.

21. A computer system comprising:
    a processor;
    a memory device comprising computer executable instructions stored therein for performing a method for finding conjunctive cluster comprising:
    ascertaining a first group of points;
    ascertaining a second group of points;
    randomly choosing a first sample from said first group of points of a first predetermined size; and
    identifying subsets of said first sample;
    for each subset of a second predetermined size of said first sample perform steps comprising;
    ascertaining a subgroup of said second group of points that share an intersection with all of the points in said subset;
    ascertaining a subgroup of said first group of points that share an intersection with a specified number of the points in said subgroup of said second group of points; and
    outputting a third group of points wherein the product of the magnitude of said subgroup of said second group and the magnitude of said subgroup of said first group is maximized, wherein one or more conjunctive clusters are found.

22. The computer system of claim 21, further comprising drawing a second sample from said first group of points wherein said subgroup of said first group of points is identified from said second sample.

23. The computer system of claim 22, wherein said first group of points represent attributes.

24. The computer system of claim 23, wherein said third group represents a biclique or conjunctive cluster.

25. The computer system of claim 24, wherein said conjunctive cluster represents overlapping clusters.

26. The computer system of claim 25, wherein each of said points belongs to multiple clusters.

27. The computer system of claim 26, wherein each of said attributes is used to describe multiple clusters.

28. The computer system of claim 27, wherein a point is not clustered if it does not fall into a specified number of largest clusters in a set of clusters and wherein an entire dataset is not read into main memory.

29. The computer system of claim 24 further comprising:
    collecting a plurality of bicliques.

30. A computer implemented method for finding conjunctive clusters comprising:
    (a) monitoring a stream sequence of points, wherein the stream sequence of points is electronic data;
    (b) identifying a series of discrete portions of said sequence of points and for each discrete portion of said sequence of points:
    (c) identifying a first group of points;
    (d) randomly drawing a first sample of points from said first group of points of a specified size;
    (e) identifying subsets of said first sample of points of a specified size; and
    (f) initializing a first plurality of counts of the number of points from said streaming sequence of points that satisfy the attributes in each of said plurality of counts of the number of points from said streaming sequence of points that satisfy the attributes in each of said subsets of said first sample, and an additional attribute from said first group,
    wherein for each point in a first discrete portion of said sequence of points that satisfies the attributes in each subset in said first sample perform steps comprising:
    (g) incrementing said first plurality of counts based on said streaming sequence of points;

(h) incrementing said second plurality of counts based on said streaming sequence of points;

(i) outputting a third group of points that constitute the largest biclique based on the first and second plurality of counts;

(j) for the next discrete portion of said sequence of points performing steps (g) through (i), wherein one or more conjunctive clusters are found.

* * * * *

UNITED STATES PATENT AND TRADEMARK OFFICE
CERTIFICATE OF CORRECTION

PATENT NO.        : 7,739,313 B2
APPLICATION NO.   : 10/448899
DATED             : June 15, 2010
INVENTOR(S)       : Nina Mishra et al.

It is certified that error appears in the above-identified patent and that said Letters Patent is hereby corrected as shown below:

On Sheet 7 of 10, in Figure 4B, delete "40" and insert -- 407 --, therefor.
Replacement Sheet is attached herewith.

On Sheet 8 of 10, in Figure 5, delete "5" and insert -- 507 --, therefor.
Replacement Sheet is attached herewith.

In column 6, line 17, after "context" insert -- of --.

Signed and Sealed this
Eighth Day of March, 2011

David J. Kappos
*Director of the United States Patent and Trademark Office*